(12) United States Patent
Yang et al.

(10) Patent No.: US 6,449,180 B1
(45) Date of Patent: Sep. 10, 2002

(54) WORLD WIDE POWER SUPPLY APPARATUS THAT INCLUDES A RELAY SWITCH VOLTAGE DOUBLING CIRCUIT

(75) Inventors: Joon-Hyun Yang; Yosiyaki Fukura, both of Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/703,703

(22) Filed: Nov. 2, 2000

(30) Foreign Application Priority Data

Nov. 2, 1999 (KR) .............................................. 99-48112

(51) Int. Cl.[7] .............................................. H02M 1/10
(52) U.S. Cl. .......................................... 363/142; 363/61
(58) Field of Search ........................ 363/142, 89, 21.08, 363/59, 61, 126

(56) References Cited

U.S. PATENT DOCUMENTS 4,937,731 A * 6/1990 Konopka ..................... 363/143
5,119,283 A * 6/1992 Steigerwald et al. .......... 363/37
5,287,263 A * 2/1994 Shilo .......................... 363/143
5,661,348 A * 8/1997 Brown ......................... 307/43
6,137,700 A * 10/2000 Iida et al. ..................... 363/89

* cited by examiner

Primary Examiner—Shawn Riley
(74) Attorney, Agent, or Firm—Sughrue Mion, PLLC

(57) ABSTRACT

A world wide power supply apparatus which includes a full-wave rectifier circuit having a pair of AC input terminals and a pair of DC output terminals, a pair of capacitors connected in serial between a pair of DC output terminals, a relay switch connected between a common connection point of capacitors and one of said pair of AC input terminals and a relay driving circuit driving said relay switch so that the relay switch can operate in a voltage doubling mode by turning on said relay switch in case that an AC voltage supplied to a pair of AC input terminals is a low voltage, and can operate in a full-wave rectification mode by turning off said relay in case of a high voltage. The power supply apparatus switches a voltage doubling circuit by using a relay with no heat generation instead of a triac.

3 Claims, 2 Drawing Sheets

WORLD WIDE POWER SUPPLY APPARATUS THAT INCLUDES A RELAY SWITCH VOLTAGE DOUBLING CIRCUIT

BACKGROUND OF THE INVENTION

1. Field of the Invention

The present invention relates to a world wide power supply apparatus, particularly to a world wide power supply apparatus which can reduce the power consumption and can improve the reliability of a power supply apparatus by constituting a switch relay for switching a full-wave rectification or voltage doubling rectification mode.

2. Description of the Prior Art

A world wide commercial AC power is classified largely as 110 V system and 220 V system. But, because there is a large deviation according to the level of quality management of the AC power by countries, a world wide power supply apparatus has to cover the range of AC 80 V 280 V.

Therefore, a conventional world wide power supply apparatus is constituted to perform voltage doubling rectification when rectifying a commercial AC power of 110 V, and to perform a full-wave rectification in case of rectifying 220 V.

FIG. 1 shows a conventional world wide power supply apparatus. A commercial AC voltage 10 is connected to a voltage doubler rectifier circuit 14 via a full-wave rectifier circuit 12. A rectified DC signal VIN is switched to a high frequency signal by a switching mode control chip at a primary part of a power transformer 18. The switched high frequency signal is output via a rectifier circuit through a secondary part of the power transformer 18.

In case of 110 V commercial AC voltage, a voltage doubler rectifier circuit 14 is selected by that a triac TR is turned on by a voltage detection circuit 16. Therefore, a positive half wave flows through a diode, a first capacitor C1 and the triac TR (shown in solid line) and then is charged to the first capacitor C1. A negative half wave flows through the triac TR, a second capacitor C2, a ground and a diode (shown in dashed line) and then is charged to the second capacitor. Therefore, a DC voltage VIN comes out as a doubled input voltage by a serial connection of the first and second capacitors C1 and C2. That is, in case of 110 V, the DC voltage comes out as 220 V.

In case that a commercial AC voltage is 220 V, the triac TR is turned on by the voltage detection circuit 16 and thus a full-wave rectifier circuit 12 is selected. Therefore, since an input AC voltage is full-rectified through the full-wave rectifier circuit 12, the DC voltage VIN becomes 220 V.

The prior art world wide power supply apparatus like the above-mentioned uses the triac TR and the voltage detection chip 16 to switch the full-wave rectification/voltage doubling rectification. The drawbacks are that the customized voltage detection chip 16 generates a strong surge voltage to the commercial AC power, or can be operated erroneously by being outside of the range of a control region in case of abnormal transient-cause forced outage. That is, because, in case that the triac TR is turned on due to the erroneous operation in a 220 V region, an AC 220 V is voltage doubling-rectified and thus 440 V appears as the DC voltage VIN, the high voltage like the above-mentioned can damage severely the switching mode control chip 20 and capacitors C1 and C2, and it is a concern that the above-mentioned conditions can cause a problem like an outbreak of a fire.

Therefore, in order to prevent the problem, a double or triple safety apparatus is needed but danger remains unchanged according to the reliability of a protection circuit.

Also, because it is necessary to supply a current for the operation of a voltage doubler circuit itself from a very high voltage input, there will be a large power loss. About 80% of a self power loss of the whole voltage doubler rectifier circuit is generated by a gate driving of a triac. Therefore, a high-priced sensitive triac is required to drive with a low current, which can be a main cause of price markup.

Because an excessive power supply noise is created in an input AC and, a high voltage resistant triac has to be used which can endure the transient voltage, and this can be a main cause of price markup. Also, a triac is required which satisfies two contradictory conditions of requiring a low gate current and at the same time having a strong endurance to noise. Therefore, a gate driving circuit must eliminate any noise generated in a gate terminal. A non-trigger voltage of a triac is about 0.2 V. Therefore, it is impossible to eliminate noise to desired extent.

SUMMARY OF THE INVENTION

It is an object of the present invention to provide a world wide power supply apparatus which can reduce a power consumption, can keep the cost down and can improve the reliability of a power supply apparatus, by constituting a switching device switching a full-wave rectification and a voltage doubling rectification mode with a relay instead of a triac.

According to one aspect of the present invention, the apparatus of the present invention comprises a full-wave rectifier circuit having a pair of AC input terminals and a pair of DC output terminals, a pair of capacitors connected in series between a pair of DC output terminals, a relay switch connected between a common connection point of capacitors and one of the pair of AC input terminals and a relay driving circuit driving the above relay switch so that the relay switch can operate in a voltage doubling mode by turning on the relay switch in case that an AC voltage supplied to a pair of AC input terminals is a low voltage, and can operate in a full-wave rectification mode by turning off the relay in case of a high voltage.

BRIEF DESCRIPTION OF THE DRAWINGS

Further objects and advantages of the invention can be more fully understood from the following detailed description taken in conjunction with the accompanying drawings in which.

DETAILED DESCRIPTION OF PREFERRED EMBODIMENTS

The present invention will hereinafter be described in detail through one embodiment of the present invention, with reference to the accompanying drawings.

Figure 1:
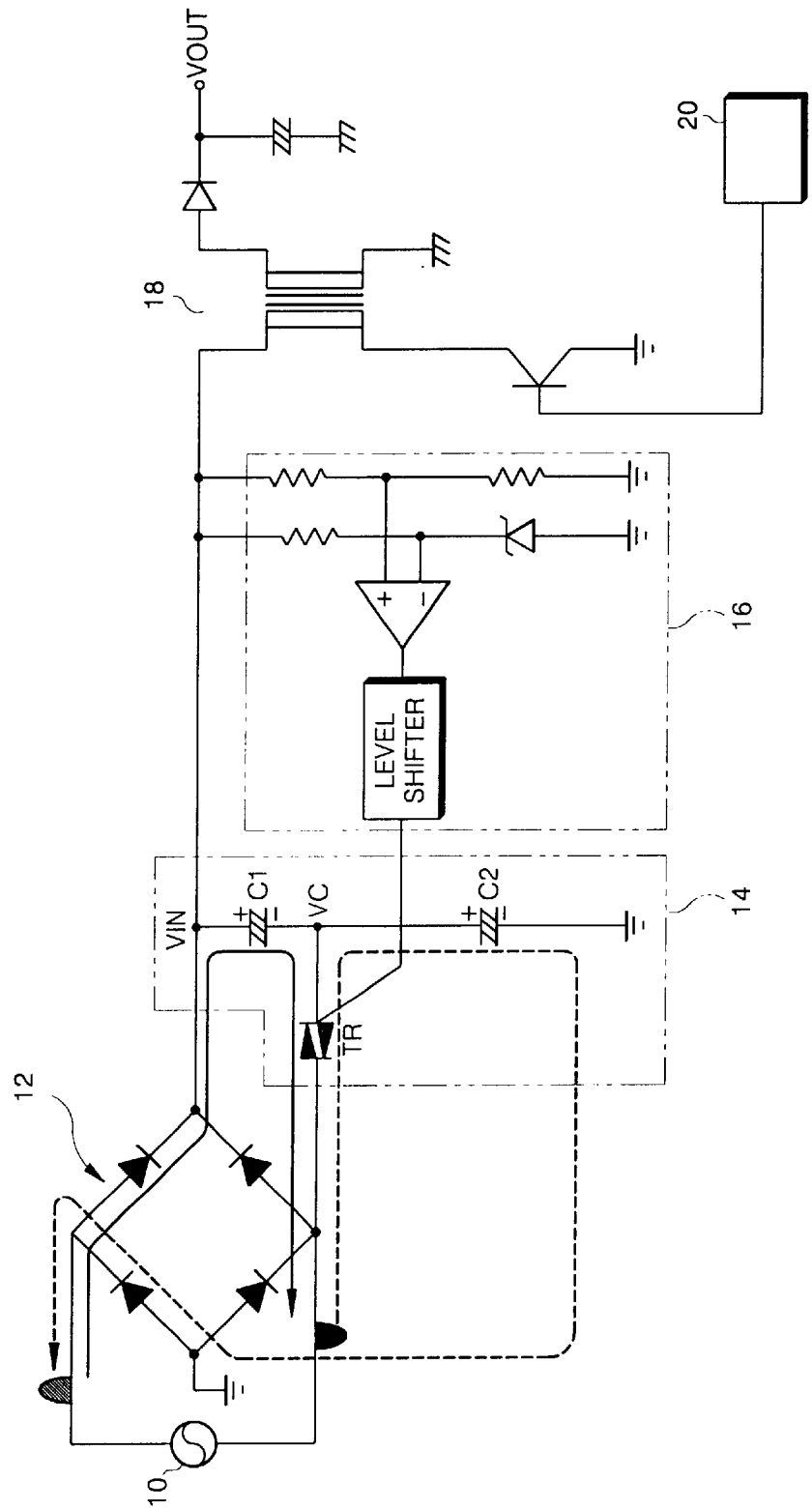
FIG. 1 is a drawing showing a configuration of a prior art full-wave rectifier/voltage doubler power supply apparatus.
Figure 2:
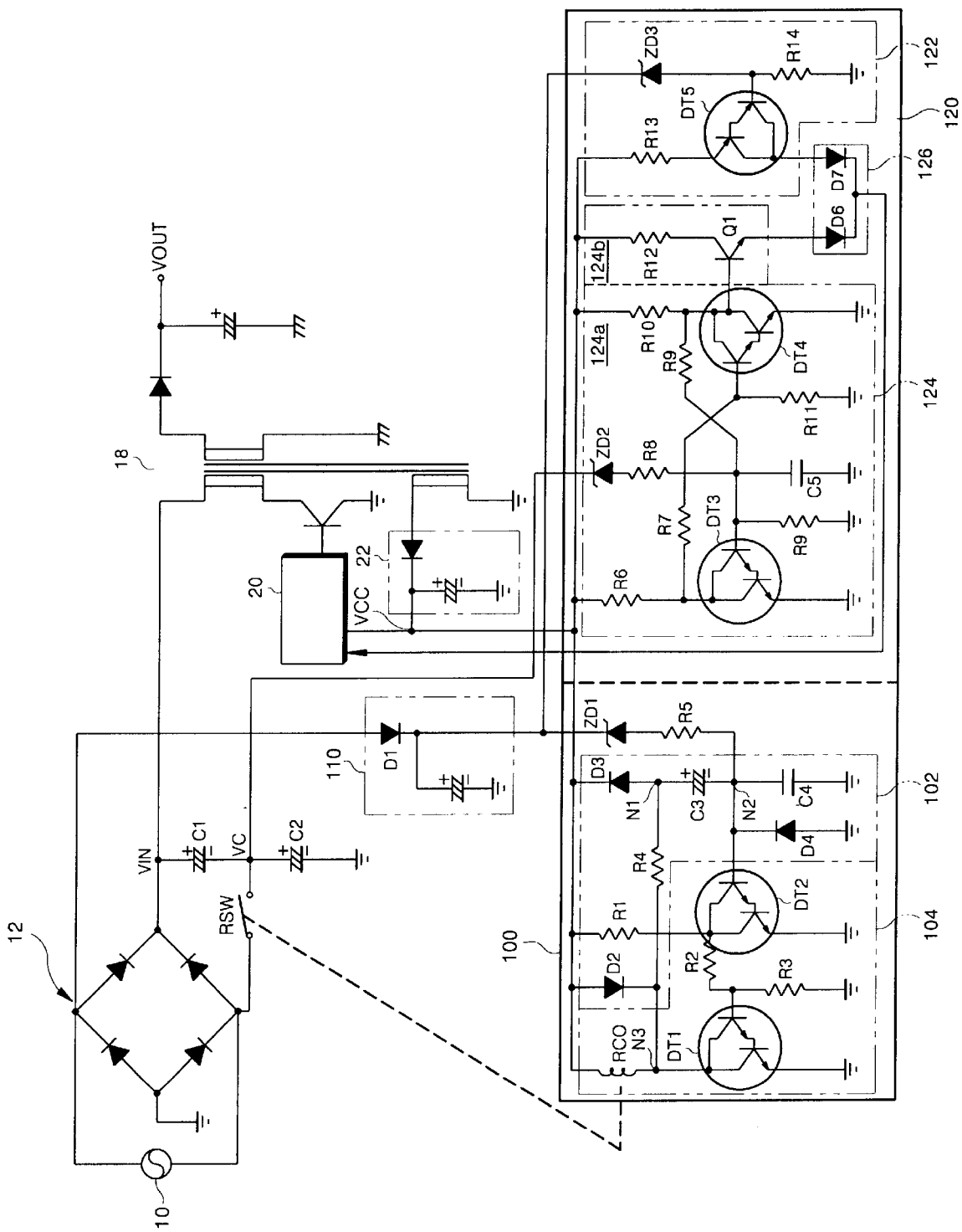
FIG. 2 is a drawing showing a preferred embodiment of a world wide power supply apparatus having a full-wave rectification/voltage doubling mode according to the present invention.

FIG. 2 shows a configuration of a preferred embodiment of a world wide power supply apparatus having a full-wave rectification/voltage doubling rectification mode by the present invention. The apparatus of the present invention includes a full-wave rectifier circuit 12, a pair of capacitors C1 and C2, a relay switch RSW, a power transformer 18, a switching mode control chip 20, an auxiliary power supply circuit 22 and a relay driving circuit 100.

The full-wave rectifier circuit 12 outputs by full-wave rectifying a commercial AC, and is constituted with a bridge diode.

A pair of capacitors C1 and C2 are connected in series between a positive output terminal and a negative output terminal of the full-wave rectifier circuit 12, and a common connection point thereof is connected to one of a pair of AC input terminals of the full-wave rectifier circuit 12, through the relay switch RSW and composes a voltage doubler rectifier circuit.

One end of a primary main winding of the power transformer 18 is connected to the positive output terminal of the full-wave rectifier circuit 12 and another end is grounded through a switching transistor. A high frequency signal induced at secondary part of the power transformer is output to a DC output voltage VOUT via a rectifier circuit.

A primary auxiliary winding of the power transformer 20 18 is connected to the auxiliary power supply circuit 22 and outputs an operation power voltage VCC. The operation power voltage VCC is provided as an operation voltage of the switching mode control chip 20 and the relay driving circuit 100.

The relay driving circuit 100 includes a DC conversion part 110 converting an output of the commercial AC 10 to a DC, an operation delay part 102 maintaining the relay switch RSW in turn-off state for a constant time in an initial operation, a driving part 104 driving the relay switch RSW in response to the DC conversion part 110 after the constant time is passed, and a protection circuit 120.

The operation delay part 102 includes a first reverse diode D3 connected between the operation power voltage VCC and a first node N1, a charge/discharge capacitor C3 connected between the first node N1 and a second node N2, a second reverse diode D4 connected between the second node N2 and a ground, a forward diode D2 connected between the operation power voltage VCC and a third node N3, and a resistor R4 connected between the first node N1 and the third node N3.

The driving part 104 includes a relay coil RCO 15 connected between the operation power voltage VCC and the third node N3, a first Darlington transistor DT1 whose collector and emitter are connected between the third node N3 and the ground respectively and base is connected to the ground through a resistor R3, a second Darlington transistor DT2 whose collector is connected to the operation power voltage VCC through a resistor R1 and also is connected to the base of the first Darlington transistor through a resistor R2 and emitter is grounded and base is connected to the second node N2, and a zener diode ZD1 which is connected between the second node N2 and an output of the DC conversion part 110 and is turned on at a high voltage. The zener diode ZD1 has a zener voltage of 200 V. A capacitor C4 for eliminating noise is further included which is connected between the second node N2 and the ground.

The protection circuit 120 includes a low voltage detection part 122 outputting a low voltage detection signal if the output of the DC conversion part 110 is lowered below a fixed level, a high voltage detection part 124 outputting a high voltage detection signal if a voltage level of the common connection point is raised above a fixed level, and an output part 126 outputting by mixing the low voltage detection signal and the high voltage detection signal.

The high voltage detection part 124 includes a zener diode ZD2 which is turned on in case that a voltage of a common connection point of a pair of capacitors C1 and C2 is above an established high voltage, for example, 230 V, a bistable latch circuit 124*a* maintaining a first state when the zener diode ZD2 is turned off, and maintaining a second state when the zener diode ZD2 is turned on, and a buffer 124*b* buffering an output of the bistable latch circuit 124*a*. The bistable latch circuit 124*a* includes Darlington transistors DT3 and DT4, resistors R6~R11 and a capacitor C5. The buffer 124*b* includes a resistor R12 and a transistor Q1.

The low voltage detection part 122 includes a zener diode ZD3 which is turned off in cast that the output of the DC conversion part 110 is below an established low voltage, for example, 80 V, and a Darlington transistor outputting a signal in a first state when the zener diode ZD3 is turned on and outputting a signal in a second state when the zener diode ZD3 is turned off, and resistors R13 and R14.

The output part 126 is formed by connecting two diodes D6 and D7 with a line and provides by performing a logic OR operation of the low voltage detection signal and the high voltage detection signal to the switching mode control chip 20.

The operation and effect of the present invention constituted like the above-mentioned will be described as follows.

If a commercial AC power is applied in the beginning, an operation power voltage VCC is applied to a base of a Darlington transistor DT2 through a diode D2, a resistor R4 and a capacitor C3, and thus the Darlington transistor DT2 is turned on. On this, because a Darlington transistor DT1 is turned off, a current does not flow through a relay coil RCO and thus a relay switch RSW maintains a turn-off state. By restricting a charge current of a capacitor C3 to 1 mA, for example, through a resistor R4, if the capacitor C3 is charged after a time of about 4 seconds is passed, a current supply through the capacitor C3 is blocked.

From that on, an output of a DC conversion part 110 reaches to a fixed level, and this level is detected by a zener diode ZD1, and if the detected voltage level is above 200V, the zener diode ZD1 is turned on and thus the Darlington transistor DT2 continues to maintain the turn-on state. That is, a state that the relay switch RSW is turned off to select a full-wave rectification mode is maintained as it is.

If the output of the DC conversion part 110 is below 200V, the zener diode ZD1 maintains the turn-off state, and because the supply of high voltage to the Darlington transistor DT2 is blocked, the Darlington transistor DT2 is turned off, and on this, the Darlington transistor DT1 is turned on and a current of about 40 mA flows through the relay coil RCO. Therefore, in case of inputting a commercial AC 120V, the relay switch RSW is turned on and the voltage doubler rectifier circuit is selected.

If the inputting of the commercial AC is stopped, the capacitor C3 maintains the initial state by discharging in an instant through a loop of the diode D4, the capacitor C3 and the diode D3. Therefore, during operation, the Darlington transistor DT2 maintains always the turn-on state and the Darlington transistor DT1 maintains always the turn-off state.

Therefore, according to the present invention, the apparatus begins always in a full-wave rectification mode in the beginning, and after that, the full-wave rectification mode or voltage doubling rectification mode is switched automatically in response to the level of an input voltage. Because the relay switching operation is detected by the zener diode ZD1, it is completed within 10 ins, for example. Therefore, it can correspond sufficiently to an abrupt input voltage variation.

In the high voltage detection part 124 of the protection circuit 120, the Darlington transistor DT4 is turned on always first in the beginning. Thus, the Darlington transistor DT3 maintains the turn-off state. By the turn-on state of the Darlington transistor DT4, an output of the buffer 124b maintains a low state. In the normal state like the above-mentioned, if a voltage VC of a common connection point rises above 230V, the zener diode ZD2 is turned on and thus the Darlington transistor DT3 is turned on and on this, the Darlington transistor DT4 is turned off. Therefore, the output of the buffer 124b is changed from a low state to a high state and thus the high voltage abnormal state of the power supply apparatus is detected. That is, the high voltage detection part 124 outputs a high voltage detection signal in a high state while detecting an abnormal high voltage.

In the low voltage detection part 122 of the protection circuit 120, because an output voltage of the DC conversion part 110 maintains at least above 80V during a normal operation, the zener diode ZD3 is turned on and thus the Darlington transistor DT5 maintains a turn-off state. Therefore, the output maintains a low state. But, if the output level of the DC conversion part 110 drops below 80V, the zener diode ZD3 is turned on, and because, on this, the Darlington transistor DT5 is turned on, the output goes to a high state. That is, the low voltage detection part 122 outputs a low voltage detection signal in a high state while detecting a low voltage.

The output part 126 provides a high state of a high voltage detection signal or a low voltage detection signal to the switch mode control chip 20. The switch mode control chip 20 judges as an abnormal state when detecting a signal in a high state in response to the output signal of the protection circuit and stops the switching operation. Therefore, because the switching operation in the primary part of the power transformer 18 is stopped by the stop of the operation of the switch mode control chip 20, the operation power voltage VCC of the auxiliary power supply circuit 22 is not generated and thus the operation of the relay driving circuit 100 is stopped. That is, the relay switch is switched to a turn-off state.

Therefore, the relay driving circuit begins to operate again like the above, after being switched to a stable full-wave rectification mode and a delay time of the operation delay part 102 of four seconds has passed.

Therefore, because the operation of the switch mode control chip 20 is stopped by detecting instantly that an abnormal state for the relay switch RSW to maintain a turn-25 on state while 220V is inputted due to the defect of the relay switch RSW or the driving circuit is generated or a high surge voltage is generated in an input voltage, the power supply apparatus is protected safely from an over-voltage or an overcurrent. Also, an unfavorable condition that the switch mode control chip 20 can be defective by an unstable oscillation operation during a low voltage.

Like the above-mentioned, the present invention can reduce a power consumption, and can achieve cost down by removing a problem of heat generation, by replacing the prior switching device switching the prior full-rectification and a voltage doubling rectification mode with a relay from a triac.

Also, the noise problem generated in an initial operation can be solved, by constituting the power supply apparatus to start from a stable full-wave rectification mode in an initial mode always, and to perform the full-wave rectification mode for four seconds to eliminate the noise effect generated in the initial operation and from that on to be switched corresponding to an input voltage level.

Also, a defect of a power supply apparatus can be prevented, by downing the switch mode control chip during a high voltage or a low voltage by adopting a protection circuit.

Also, the power consumption of a power supply apparatus can be reduced by minimizing the power consumption of a relay driving circuit and a protection circuit.

While the present invention has been described with respect to the particular embodiments, it will be apparent to those skilled in the art that various changes and modifications may be made without departing from the spirit and scope of the invention as defined in the following claims.

What is claimed is:

1. A world wide power supply apparatus, comprising:
    a full-wave rectifier circuit having a pair of AC input terminals and a pair of DC output terminals;
    a pair of capacitors connected in series between said pair of DC output terminals;
    a relay switch connected between a common connection point of said capacitors and one of said pair of AC input terminals; and
    a relay driving circuit driving said relay switch so that said relay switch operates in a voltage doubling mode by turning on said relay switch when an AC voltage supplied to said pair of AC input terminals is a low voltage, and operates in a full-wave rectification mode by turning off said relay when said AC voltage supplied to said pair of AC input terminals is a high voltage,
    wherein said relay driving circuit comprises:
        a voltage convention part converting said AC voltage supplied to said pair of AC input terminals to a DC voltage,
        an operation delay part maintaining said relay switch in a turn-off state for a constant time in an initial operation, and
        a driving part driving said relay switch in response to said voltage conversion part after said constant time is passed.

2. The world wide power supply apparatus according to claim 1, wherein said relay driving circuit further comprises a protection circuit, said protection circuit comprising:
    a low voltage detection part outputting a low voltage detection signal when an output of said voltage conversion part is lowered below a fixed level;
    a high voltage detection part outputting a high voltage detection signal when a voltage level of said common connection point is raised above a fixed level; and
    an output part outputting by mixing said low voltage detection signal and said high voltage detection signal.

3. The world wide power supply apparatus according to claim 2, wherein a low voltage of said low voltage detection part is 80V and a high voltage thereof is 230V.

* * * * *